United States Patent
Wu et al.

(10) Patent No.: US 6,227,240 B1
(45) Date of Patent: May 8, 2001

(54) UNITIZED SPHERICAL PROFILE CHECK VALVE WITH REPLACEABLE SEALING ELEMENT

(75) Inventors: Samuel S. Wu, Houston; Ronald Trammell, Tomball, both of TX (US)

(73) Assignee: National-Oilwell L.P., Houston, TX (US)

( * ) Notice: Subject to any disclaimer, the term of this patent is extended or adjusted under 35 U.S.C. 154(b) by 0 days.

(21) Appl. No.: 09/417,555

(22) Filed: Oct. 13, 1999

(51) Int. Cl.$^7$ .................................................. F16K 15/02
(52) U.S. Cl. ................... 137/543.19; 137/516.29; 251/337
(58) Field of Search ..................... 137/535, 538, 137/540, 543.19, 516.29; 251/337

(56) References Cited

U.S. PATENT DOCUMENTS

| | | | |
|---|---|---|---|
| 1,693,355 | * 11/1928 | Thompson | 137/543.19 X |
| 2,161,833 | * 6/1939 | Paget | 137/543.19 |
| 2,274,996 | * 3/1942 | Spinney | 137/543 |
| 2,329,576 | * 9/1943 | Anderson | 137/516.29 |
| 2,683,464 | * 7/1954 | St. Clair | 137/540 |
| 2,710,023 | * 6/1955 | Blackford et al. | 137/543.19 |
| 2,904,065 | * 9/1959 | Butlin | 137/543.19 X |
| 2,940,472 | * 6/1960 | Chilcoat | 137/540 |
| 3,025,874 | * 3/1962 | Yocum | 137/540 |
| 3,029,835 | * 4/1962 | Biello et al. | 137/540.19 |
| 3,358,770 | * 12/1967 | Zandmer | 137/543.19 |
| 3,457,949 | * 7/1969 | Coulter | 137/543.19 |
| 3,503,418 | * 3/1970 | Petrucci et al. | 251/337 X |
| 3,664,371 | * 5/1972 | Schneider | 137/543.19 |
| 4,700,741 | * 10/1987 | Murphy | 137/543.19 |
| 5,193,577 | * 3/1993 | de Koning | 137/516.29 |
| 5,193,579 | * 3/1993 | Bauer et al. | 137/543.19 |
| 5,226,445 | * 7/1993 | Surjaatmadja | 137/516.29 |
| 5,230,363 | * 7/1993 | Winn, Jr. et al. | 137/516.29 X |
| 5,353,834 | * 10/1994 | Schmitt et al. | 137/543.19 X |
| 5,435,337 | * 7/1995 | Kemp | 137/540 |
| 5,435,345 | * 7/1995 | Robinson et al. | 137/508 |
| 5,839,468 | * 11/1998 | Allred | 137/543.19 |

* cited by examiner

*Primary Examiner*—John Rivell
(74) *Attorney, Agent, or Firm*—Conley, Rose & Tayon P.C.

(57) ABSTRACT

A unitized check valve assembly comprises: a valve body having a bore therethrough, the bore having an inlet and an outlet, a valve disk engaging said body at said outlet, a valve retainer engaging the body and surrounding the valve disk and the outlet; a first biasing member in compression between the body and the valve retainer; and a second biasing member in compression between the body and the valve disk. The flow passage between the valve seat and the valve is continuous around the circumference of the valve. In a preferred embodiment, the valve body and the valve disk each have a mating surface, the mating surfaces define an interface therebetween, and the interface comprises a portion of a spherical surface.

24 Claims, 6 Drawing Sheets

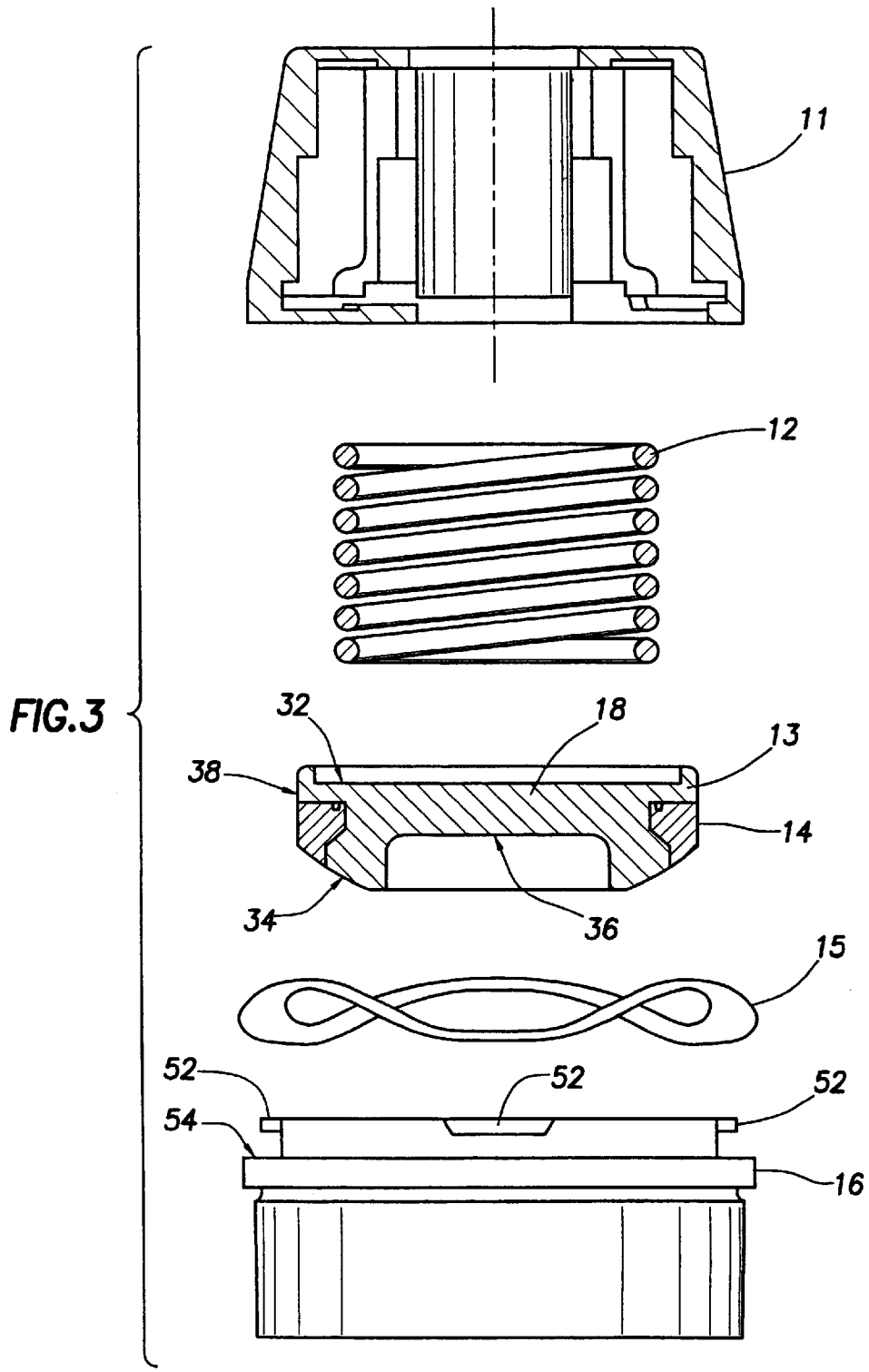

UNITIZED SPHERICAL PROFILE CHECK VALVE WITH REPLACEABLE SEALING ELEMENT

TECHNICAL FIELD OF THE INVENTION

The invention generally relates to check valves used in pumping operations. More specifically, the invention relates to a check valve for pumping applications that includes a spherically profiled valve seat, a spherically profiled valve member, a replaceable spherically or conically profiled sealing member, a secondary means for maintaining the assembly as a unit, and a fluid outlet passageway that is unrestricted about the periphery of the sealing member.

BACKGROUND OF THE INVENTION

Check valves are devices that allow fluid to flow through a passageway in one direction but block flow in the reverse direction. They are used in a variety of applications. One of the many industrial applications for check valves is in reciprocating pump assemblies. Reciprocating pumps are used by field workers in various operations to pressurize a slurry mixture of solids and liquids and transfer fluids and mixtures from one station to another.

For example, reciprocating pumps are used in drilling operations to pressurize a slurry mixture of solids and liquids known as drilling mud to the bottom of a hole drilled into the earth. The pressurized mud is used to lubricate and cool a downhole drill bit as well as to carry loosened sediment and rock cuttings back to the surface. At the surface, the cuttings and sediment are removed from the returning drilling mud for examination and the filtered drilling mud is able to be reused. In many cases, highly abrasive particles are present in the fluids that are being pumped through the system. Because of these highly abrasive components, valves and seals of reciprocating pumps must be designed to resist harsh abrasion, while maintaining positive sealing action and withstanding high operating pressures.

A schematic diagram of a check valve supported reciprocating pump is shown in FIG. 1. In a pump of this type, a piston 21 reciprocates within a cylinder 20 in the direction shown by arrow 24. Check valves 22 are utilized at inlets 25 and outlets 26 of the cylinder 20 to restrict the flow of fluid to one direction. At fluid inlet 25, a check valve 22 is placed and oriented so that it only allows inward flow. At outlet 25, another check valve 26 is located so that it that only allows outward flow. The use of check valves 22 at pump inlets 25 and outlets 26 enables the pump to function in a much simpler fashion that does not require a timing or driving means to open and close the inlet 25 and outlet 26 valves at the appropriate times. Check valves 22 are often spring loaded so that at times of low or zero flow pressure, they are automatically shut. Effective check 410 valves 22 for pumping applications are also designed so that pressure in the back-flow direction contributes to the strength of the sealing mechanism.

For pump applications that utilize multiple check valves, it is preferred that all check valves be of the same design to ensure that the inlet and outlet flow characteristics of the pump are similar. Additionally, identical check valves allow the pump operator to carry fewer replacement parts, since he or she only has to carry parts for one type of valve. In many applications, it is further preferred that the check valves be unitized, or self-contained. A damaged unitized check valve can be easily removed from the pump assembly and replaced with minimal tooling and effort. Once the unitized check valve has been removed from the pump device, it can be disassembled and repaired if possible. By replacing check valves as units, expensive delays in operations can be minimized.

FIG. 2 shows a prior art unitized check valve that is typical of those used in reciprocating pump assemblies. The prior art check valve assembly 80 includes a valve body 81, a seal member 82, a biasing spring 83, and a spring retainer 84. The seal member 82 has a conical seal face 88 and guide legs 85 that facilitate the alignment within the valve body 81. The valve body 81 has a corresponding conical valve seat 87, and inner diameter 89, and rotary retaining tabs 90 for engaging the spring retainer 84. The spring retainer 84 has rotary retaining hooks 91 and fluid flow passageways 86. The rotary retaining hooks 91 of the spring retainer 84 correspond with the rotary retaining tabs 90 of the valve body 81 to form what is commonly referred to as a bayonet connector.

The check valve is assembled by placing seal member 82 into valve body 81, placing biasing spring 83 on top of seal member 82, placing the spring retainer 84 over spring 83 and compressing spring 83 until spring retainer 84 meets valve body 81, and engaging the bayonet connectors by turning retainer 84 clockwise with respect to valve body 81. Once assembled, seal member 82 is free to move up and down within the assembly while the guide legs 85 assure that when in the down position, the seal face 88 of the seal member 82 aligns properly with the valve seat 87. The valve design allows flow from valve body 81 through retainer 84 but prevents the fluid from flowing from retainer 84 through the valve body 81. The biasing spring 83 acts both to shut the valve during situations of low pressure and to maintain the tension required to keep the bayonet connection engaged.

It is preferred that all components of a reciprocating pump be designed so that the flow of the working fluid is as unrestricted as possible. Obstructions to fluid flow in the pump assembly can create fluid turbulence which increases the flow resistance of the fluid. By reducing flow resistance, a pump's efficiency, or ratio of work output to work input, can be increased. Increasing the efficiency of the pumping device reduces the costs of operation. In addition, because of the aforementioned abrasive particles existent in fluids, if prior art check valves are installed in solids laden pumping applications, they would experience a tremendous amount of erosion wear and fail prematurely. Hence, an effective check valve design for reciprocating pump applications should be able to withstand abrasive elements and maintain a tight seal.

The guide leg design of the prior art unitized check valve blocks the free flow of fluid from the valve body to the spring retainer and can cause undesirable turbulence. Also, the prior art design check valve includes a single biasing spring to compress the sealing member against the valve seat and to maintain the bayonet connection between the valve body and the spring retainer. In the event of failure or weakening of this biasing spring, the prior art valve can come apart during operation and damage the surrounding pump components. In order to prolong pump life and minimize operating costs, an alternative to the prior art design is desirable.

BRIEF SUMMARY OF THE INVENTION

The present invention is a unitized check valve that includes a spherical valve seat geometry, a free flowing design, a field replaceable valve seal, and an independent assembly maintenance device. The spherical geometry offers an improvement over traditional conical geometry by allowing the valve to function without precise alignment of its components. By eliminating the need for guidance members of traditional designs, disruptions to fluid flow within the valve and induced flow turbulence can be minimized.

The invention also incorporates a replaceable seal element about the seal disk that is able to withstand the particulate abrasion that occurs in some reciprocating pump applications. When the elastomeric seal element finally does wear to ineffectiveness, the element can be quickly replaced in the field, allowing the valve to be inexpensively repaired and returned to use.

In one preferred embodiment the assembly maintenance device is a wave spring compression element. The assembly maintenance device acts independently of the valve disc biasing device to maintain the unity of the check valve assembly in the event of failure or weakening of the main valve biasing spring.

BRIEF DESCRIPTION OF THE DRAWINGS

FIG. 3 is an exploded drawing of a unitized check valve in accordance with the present invention;

DETAILED DESCRIPTION OF THE PREFERRED EMBODIMENT

Figure 1:
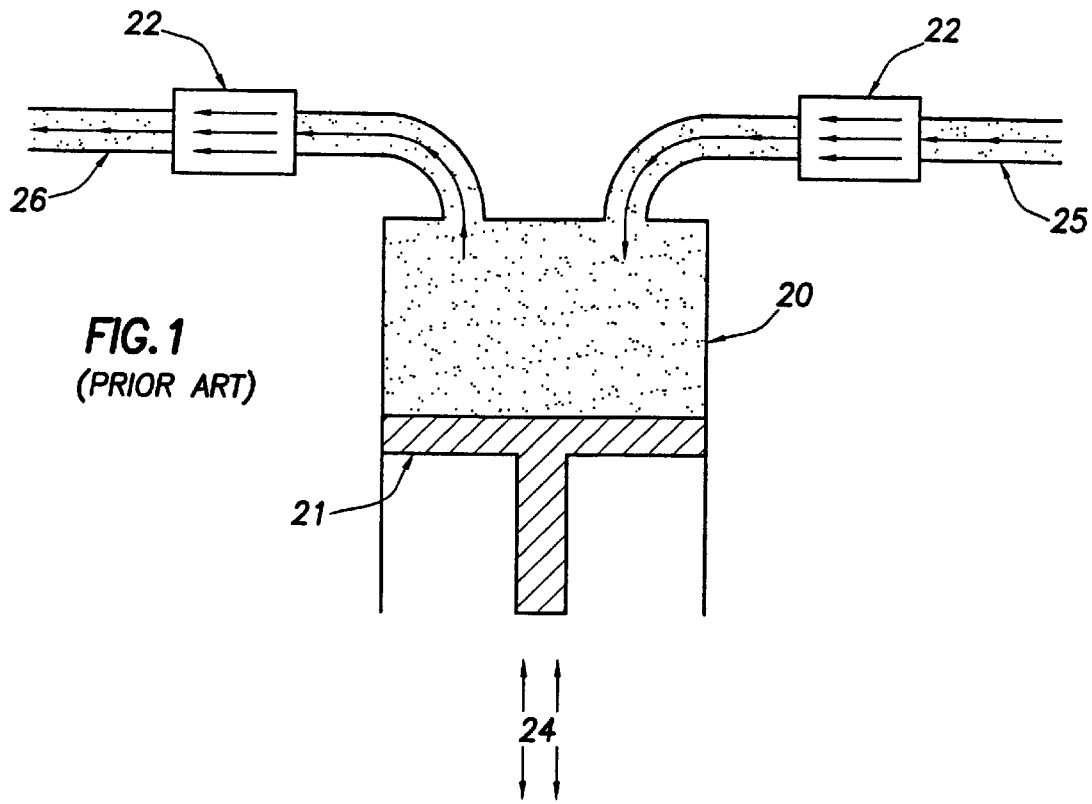
FIG. 1 is a schematic representation of a reciprocating pump apparatus that utilizes inlet and outlet check valves.
Figure 2:
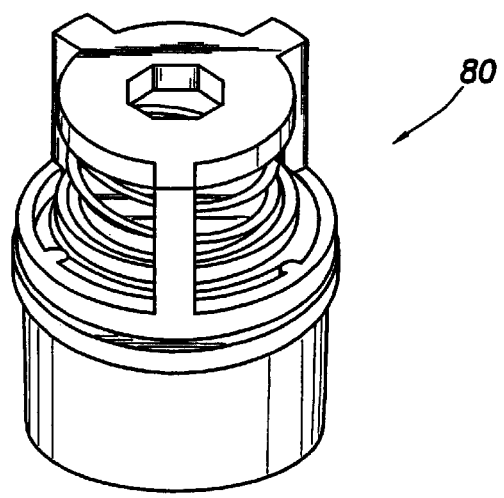
FIG. 2 is an exploded drawing of a typical prior art unitized check valve.
Figure 2A:
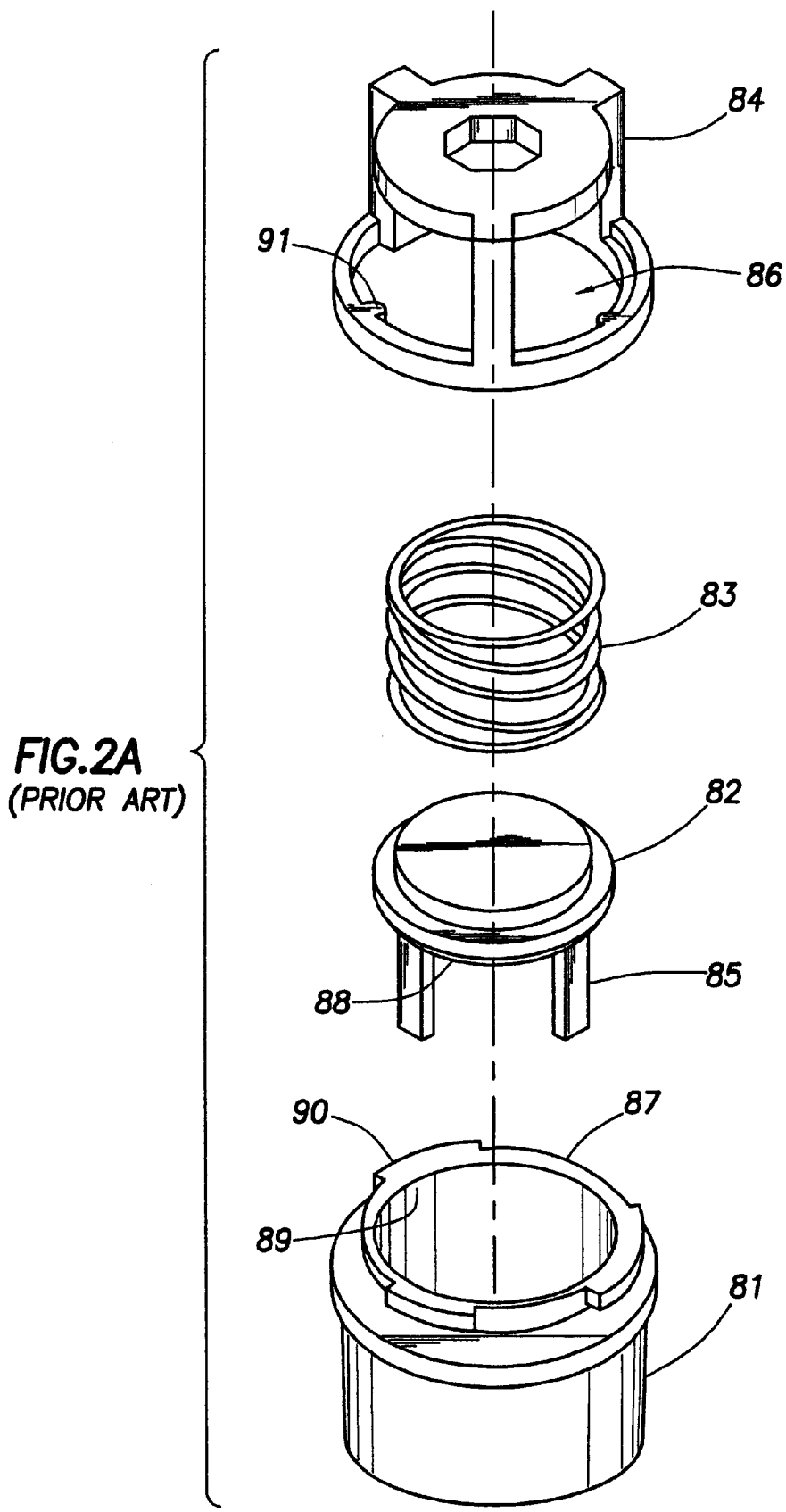
FIG. 2b is a perspective view of the device of FIG. 2a in its assembled state.
Figure 4:
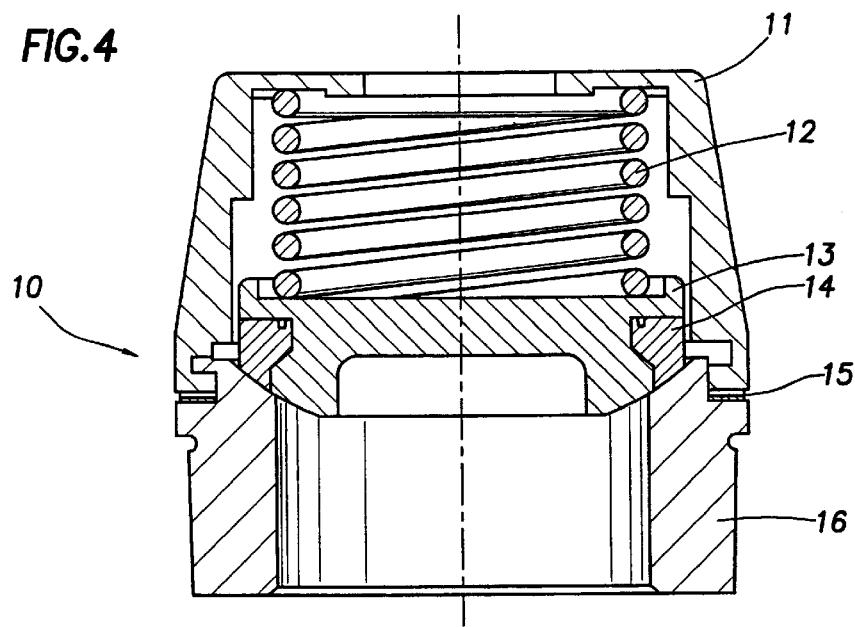
FIG. 4 is an assembly drawing of the unitized check valve of FIG. 3.

Initially referring to FIGS. 3 and 4, a unitized check valve assembly 10 in accordance with the present invention, includes an outlet shroud 11, a biasing spring 12, a valve 18, a wave spring 15, and a valve body 16. According to a preferred embodiment, valve 18 comprises a valve sealing disk 13 and a replaceable seal device 14.

Figure 5:
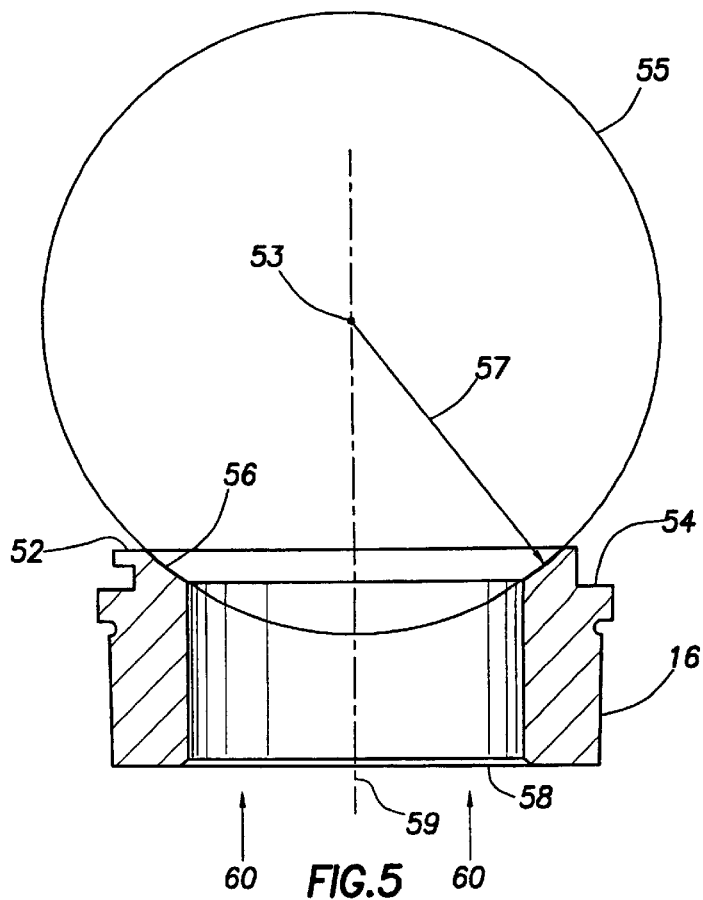
FIG. 5 is a section view of the valve body of the unitized check valve of FIG. 3.

Referring now to FIG. 5, valve body 16 includes a spherically profiled valve seat 56, rotary bayonet connector tabs 52, a load face 54 and a fluid inlet 58. The profile of the spherical valve seat 56 can be described as the surface of intersection between the valve body 16 and an imaginary sphere 55 that includes a radius 57 and a center point 53 that lies on the center axis 59 of valve body 16.

Figure 6:
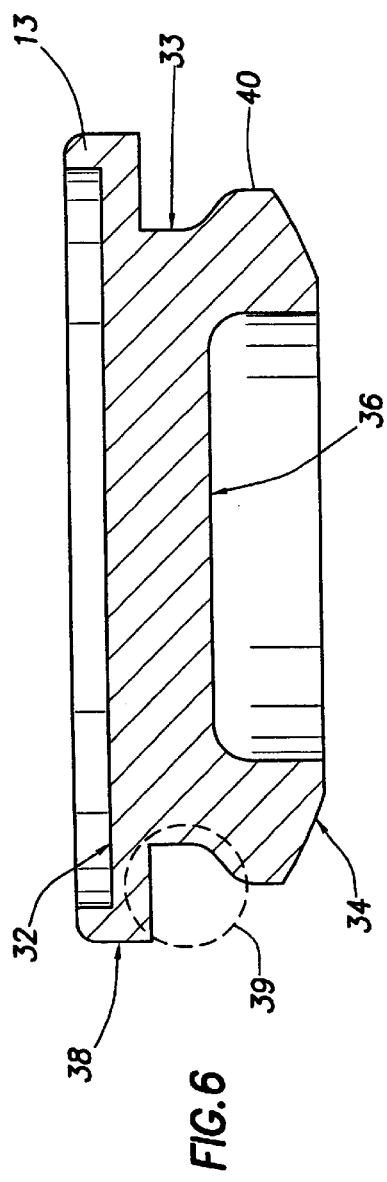
FIG. 6 is a section view of the seal disk of a the unitized check valve of FIG. 3.
Figure 7:
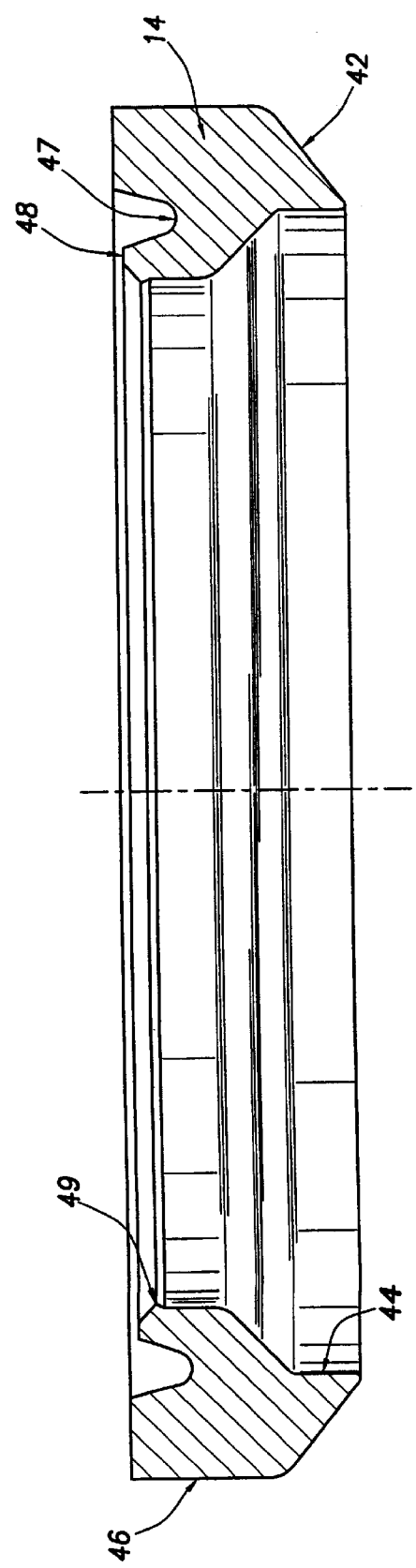
FIG. 7 is a section view of the replaceable seal member of the unitized check valve of FIG. 3.

Referring now to FIGS. 6 and 7, valve disk 13 preferably includes an outer diameter 38, a disk surface 34, an annular shoulder 40, a seal diameter 33, and a biasing spring seat 32. The disk surface 34 is preferably spherical in profile and corresponds to the geometry of the valve seat 56 portion of the valve body of FIG. 5. A cutaway 36 is located at the bottom of the valve disk 13 and is for the purpose of reducing the overall weight of the disk. The seal pocket 39 defined between the outer diameter 38 and the seal diameter 33 is adapted to receive replaceable seal 14.

Referring now to FIG. 7, seal 14 includes a seal outer diameter 46, an annular seal surface 42, an annular v-notch 47 and an inner seal member 48 having an inner seal lip 49. Seal 14 is preferably constructed to have a smaller inside diameter than the outside seal diameter 33 of seal disk 13. The seal 14 is installed on valve disk 13 by stretching it over shoulder 40 until it rests within seal pocket 39. Because the relaxed diameter of lip 49 is less than seal diameter 33, seal member 48 is stretched and v-notice section 47 is compressed. This causes the inner seal lip 49 to press firmly against the seal diameter 33 thereby forming a fluid-tight seal between valve disk 13 and seal 14.

Like disk surface 34 of valve disk 13, seal surface 42 of seal 14 is preferably spherical in profile and also corresponds to the geometry of the valve seat 56. Because of its elasmeric characteristics, seal surface 42 of seal 14 can also be conical. Once installed about valve disk 13, seal surface 42 and disk surface 34 form the primary means to prevent reverse flow of the working fluid from the valve outlets 64 through the inlet 58. Because it is removable from valve disk 13, seal 14 can be easily replaced as it becomes worn, thus allowing a longer working life for valve disk 13.

Figure 9:
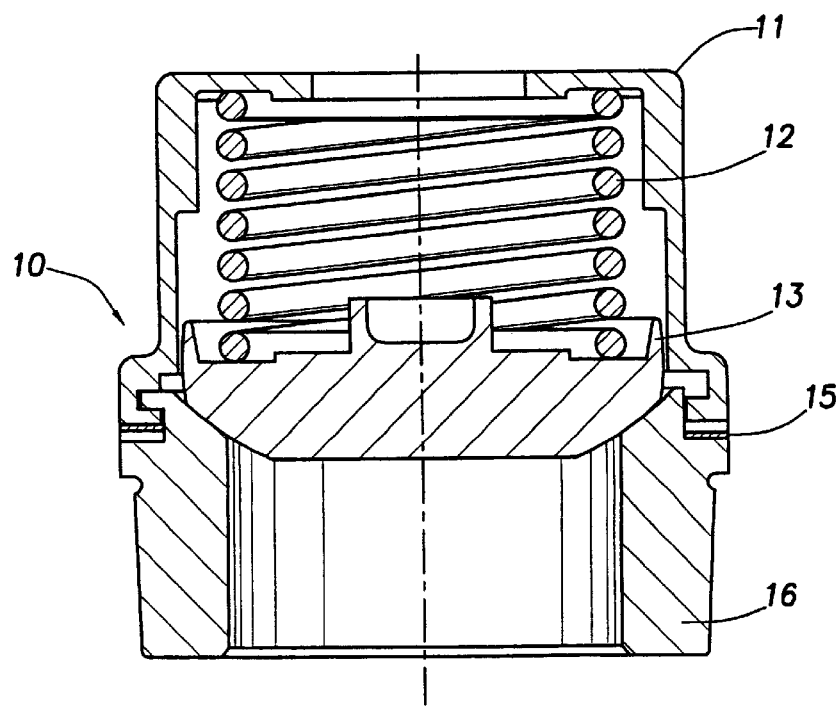
FIG. 9 is an assembly drawing of the unitized check valve without seal device.

It will be understood that seal 14 can be omitted from the present design as shown in FIG. 9, if desired. Valve disk 13 itself can be made of an elastomer, if desired, or from any other material that is adapted to withstand the fluid flow, so long as it is capable of forming a seal with valve seat 56.

Figure 8:
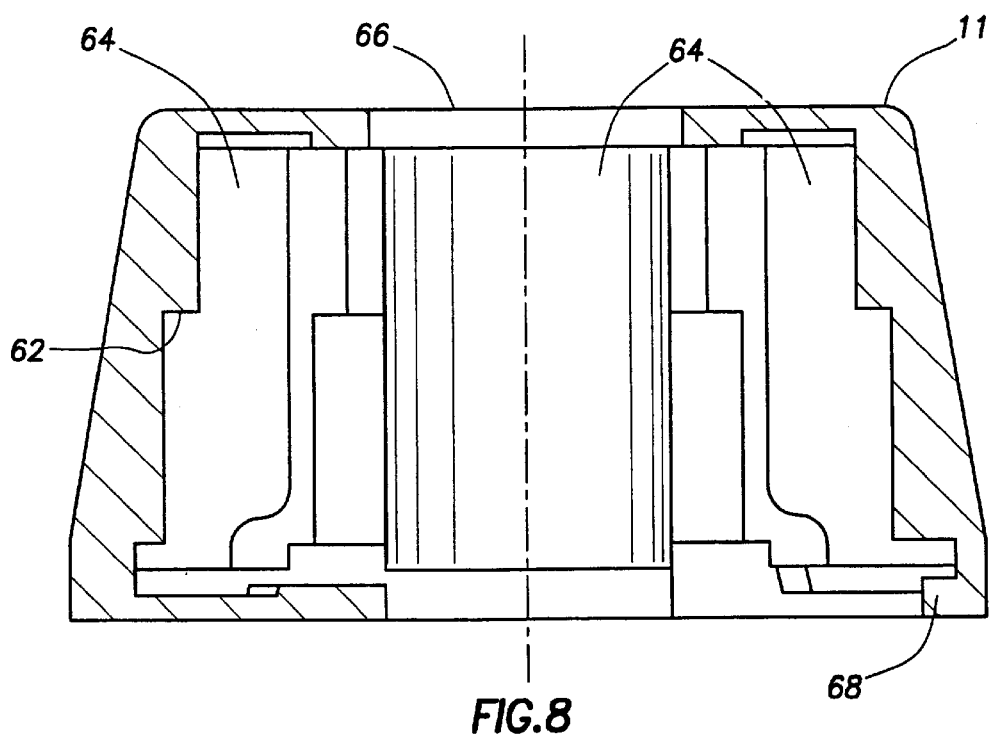
FIG. 8 is a section view of the outlet shroud of the unitized check valve of FIG. 3.

Referring now to FIG. 8, outlet shroud 11 includes valve outlet cutaways 64 located about the periphery and rotary bayonet connector hooks 68 corresponding to the bayonet connector tabs 52 of valve seat 16. A disk stop 62 is included inside the outlet shroud to prevent displacement of the valve disk 13 beyond a specified maximum distance from valve seat 52.

Referring again to FIGS. 3 and 4, biasing spring 12 and wave spring 15 can be described. Biasing spring 12 is a simple coil spring that, when compressed, acts to maintain a load between the outlet shroud 11 and the valve disk 13. Although an embodiment comprising a simple coiled metal spring with circular cross-section is shown, alternative embodiments of the invention include any suitable biasing means, including those of non-metallic composition or non-circular cross-section. Additionally, an alternative embodiment of the invention can include a biasing member manufactured of a viscous elastic material, for example a soft rubber or elastomer, that provides a damping effect to the valve disk in addition to any spring effects of traditional spring devices.

Wave spring 15 is preferably manufactured from a flat metal ribbon of generally rectangular cross-section that is formed into a circular ring. Around the circumference of this ring 15, the ribbon material is upset into the sinusoidal geometry shown in FIG. 4. Because of its sinusoidal configuration, appears to be "wave" shaped when viewed from the side. The wave spring 15 is equivalent in function to a typical coiled wire compression spring, but is dramatically reduced in height. The wave spring 15 is preferable to other styles of compact compression springs because of its simplicity of operation, its ease of assembly, and its ability to reliably provide a compression load that is not too high or too low.

The unitized check valve shown in FIGS. 3 and 4 is assembled by placing valve disk 13 with assembled seal 14 on top of valve seat 56 portion of valve body 16. Wave spring 5 is then installed over the bayonet retaining tabs 52 and seated on the load face 54 of the valve body 16. Biasing spring 12 is placed into spring seat 32 of valve disk 13 and outlet shroud 11 is placed over biasing spring 12. To complete the assembly, outlet shroud 11 is forced toward valve body 16, compressing both biasing spring 12 and wave spring 15. While both springs 12 and 15 are compressed, outlet shroud 11 is rotated until the bayonet connector hooks 68 are aligned with their counterpart tabs 52 on valve body 16. Once the tabs 52 and hooks 68 are aligned, springs 12 and 15 can be further compressed until outlet shroud 11 can be rotated to engage the bayonet connection.

Following assembly, the unit check valve can be placed into operation. The valve is designed to "open" and allow fluid passage when the force of the working fluid in the positive flow direction 60 exceeds the compressive load of biasing spring 12 that maintains valve 18 against the valve seat 56. If flow pressure decreases or reverses direction, the biasing spring will act to close the valve 18 against the valve seat 56 and prevent reverse fluid flow.

The disk stop 62 is included in the geometry of the outlet shroud 16 to prevent displacement of the valve disk 13 beyond a predetermined maximum allowable displacement. Excessive displacement of the valve disk 13 may cause the disk to become stuck or reversed within the outlet shroud. A stuck or reversed valve disk 13 will prevent the valve assembly 10 from functioning properly. Disk stop 62 prevents such excessive displacement.

Wave spring 15 serves to maintain the bayonet connection and to prevent undesired disassembly of check valve 10 during operation. In unitized check valves without assembly maintenance springs 15, the main biasing spring 12 acts as the only means securing the bayonet connector. In the event of biasing spring 12 failure or weakening, the bayonet connector can come apart during use, with serious consequences. Since the wave spring 15 of the present invention is not cycled with the opening and closing of the valve, it does not experience the fatigue experienced by conventional biasing springs 12 and can maintain the unity of the check valve 10 long after other components fail.

The spherical valve seat 56 and spherical seal surfaces 34 and 42 are preferred because they allow positive sealing without requiring precise alignment of the mating components. Prior art systems that utilize conical sealing surface geometries require alignment devices to ensure that the valve seats and seals effectively. Because the invention does not require precise alignment of valve disk 13 with valve body 16, no alignment devices is required. By removing the need for alignment guides, the flow through the apparatus is unobstructed, making the valve assembly 10 of the present invention less flow restrictive than prior designs.

Finally, since the primary sealing device 14 of the check valve 10 is replaceable, the lifetime of the valve assembly can be extended well beyond the lifetime of traditional valves by simply replacing worn seals. The replaceable seal design enjoys an advantage over its predecessors because of the range of materials that may be selected for seal 14. Depending on the composition of the fluid being flowed through the check valves, seal materials can be selected to maximize performance and durability for specific applications.

Although some aspects of the present invention are described with particular reference to a unitized check valve used with reciprocating pumps, it will be recognized that features thereof may be used or adopted to use in other applications and that the present invention can be used advantageously in any reciprocating pump application. While the preferred embodiments of the invention have been shown and described, modifications thereof can be made by one skilled in the art without departing from the spirit and teachings of the invention. For example, the relative dimensions of various parts, the materials from which the components are made and other parameters can be varied.

The embodiments described herein are exemplary only, and are not limiting. Many variations and modifications of the invention and the principles disclosed herein are possible and are within the scope of the invention. Accordingly, the scope of protection is not limited by the description set out above, but is only limited by the claims that follow, that scope including all equivalents of the subject matter of the claims.

What is claimed:

1. A unitized check valve assembly comprising:
   a valve body having a bore therethrough, said bore having an inlet and an outlet;
   a valve disk engaging said body at said outlet;
   a valve retainer engaging said body and surrounding said valve disk and said outlet;
   a first biasing member in compression between said body and said valve retainer and urging said body into engagement with said valve retainer; and
   a second biasing member in compression between said valve retainer and said valve disk and urging said valve retainer and said valve disk apart;
   wherein the valve assembly is configured such that fluid pressure that compresses the second biasing member does not tend to compress said first biasing member.

2. The check valve assembly according to claim 1 wherein said valve body and said valve disk each have a mating surface, said mating surfaces define an interface therebetween, and said interface comprises a portion of a spherical surface.

3. The check valve assembly according to claim 1 wherein said valve disk includes a replaceable insert.

4. The check valve assembly according to claim 1 wherein said valve disk includes a replaceable insert and said replaceable insert includes opposed interface and back surfaces, said insert interface surface forming part of said valve disk mating surface and said insert back surface being supported by said valve disk.

5. The check valve assembly according to claim 1 wherein said valve disk includes an elastomeric replaceable insert.

6. The check valve assembly of claim 1 wherein when said valve disk moves away from said outlet, a flow passage is formed between said valve seat and said valve and said flow passage is continuous around the circumference of said valve.

7. The check valve assembly of claim 4 wherein said replaceable insert includes an annular groove in said insert back surface.

8. The check valve assembly of claim 7 wherein said groove acts to prevent fluid from passing between said valve disk and said replaceable insert.

9. A unitized check valve assembly comprising:
   an apertured body including an inlet and an outlet including a valve seat;
   a valve configured to seal said outlet when said valve engages said valve seat;
   a retainer including a valve stop such that when said valve is urged away from said valve seat, its displacement from said valve seat is limited by said valve stop;

a latch for connecting said retainer to said base;

a first biasing member urging said retainer away from said base so as to maintain engagement of said latch; and a second biasing member urging said valve away from said retainer and into engagement with said valve seat;

such that when fluid pressure at said inlet is sufficient to overcome the force applied to said valve by said second biasing member, said valve moves away from said seat and into an open position that allows fluid to flow through said outlet.

10. The check valve assembly of claim 9 wherein said latch is a bayonet connector.

11. The check valve assembly of claim 9 wherein said first biasing member is a spring.

12. The check valve assembly of claim 9 wherein said first biasing member is a wave spring.

13. The check valve assembly of claim 9 wherein when said valve is in said open position, a flow passage formed between said valve seat and said valve is continuous around the circumference of said valve.

14. The check valve assembly of claim 9 wherein said valve seat has a profile defined by the intersection of the body with an imaginary sphere having a center point located along a center axis of said body aperture.

15. The check valve assembly of claim 14 wherein said valve includes a mating surface defined by a portion of a sphere having the same radius of curvature as the curvature of said valve seat.

16. The check valve assembly of claim 15 wherein said mating surface is defined at least in part by a replaceable seal insert.

17. The check valve assembly of claim 16 wherein said replaceable seal insert includes a lip that engages said valve and has a positive sealing with said valve disk.

18. The check valve assembly of claim 16 wherein said replaceable seal insert comprises a wear-resistant elastomer.

19. A unitized check valve assembly comprising:

a valve body having a bore therethrough, said bore having an inlet and an outlet;

a valve disk engaging said body at said outlet, said valve body and said valve disk each having a mating surface, said mating surfaces defining an interface therebetween, and said interface comprising a portion of a spherical surface;

a valve retainer engaging said body and surrounding said valve disk and said outlet;

a first spring in compression between said body and said valve retainer; and a second spring in compression between said valve retainer and said valve disk;

wherein the valve assembly is configured such that fluid pressure that compresses the second spring does not tend to compress said first spring.

20. The check valve assembly according to claim 19 wherein said valve disk includes an replaceable elastomeric insert.

21. The check valve assembly according to claim 19 wherein said valve disk includes a replaceable insert and said replaceable insert forms part of said valve disk mating surface.

22. The check valve assembly of claim 19 wherein a flow passage between said valve seat and said valve is continuous around the circumference of said valve.

23. A unitized check valve assembly comprising:

a valve body having a bore therethrough, said bore having an inlet and an outlet;

a valve disk engaging said body at said outlet, said valve body and said valve disk each having a mating surface, said mating surfaces defining an interface therebetween, and said interface comprising a portion of a spherical surface;

a valve retainer engaging said body and surrounding said valve disk and said outlet;

a spring in compression between said body and said valve retainer; and a spring in compression between said valve retainer and said valve disk;

wherein said valve retainer is retained on said body by a bayonet connector.

24. A unitized check valve assembly comprising:

a valve body having a bore therethrough, said bore having an inlet and an outlet;

a valve disk engaging said body at said outlet;

a valve retainer engaging said body and surrounding said valve disk and said outlet;

a first biasing member in compression between said body and said valve retainer and maintaining said valve retainer in engagement with said body; and a second biasing member in compression between said valve retainer and said valve disk and maintaining said valve disk in engagement with said body;

wherein the valve assembly is configured such that fluid pressure that compresses the second biasing member does not tend to compress said first biasing member.

* * * * *